United States Patent
Kumada

[11] Patent Number: 6,098,255
[45] Date of Patent: Aug. 8, 2000

[54] CLIP FOR MESH-DEFINING LAMP SET

[75] Inventor: Isao Kumada, Zhuhai, China

[73] Assignee: Minami International Corporation, Yonkers, N.Y.

[21] Appl. No.: 09/361,759

[22] Filed: Jul. 27, 1999

[30] Foreign Application Priority Data

Feb. 4, 1999 [CN] China ............................. 99 2 35357.2

[51] Int. Cl.$^7$ ................................ A44B 21/00; F16L 3/00
[52] U.S. Cl. ........................ 24/543; 24/30.5 P; 248/68.1
[58] Field of Search ............................ 24/30.5 R, 30.5 P, 24/30.55, 16 PB, 487, 535, 542–545, 557, 563, 565, 568; 248/68.1, 74.2

[56] References Cited

U.S. PATENT DOCUMENTS

| | | | |
|---|---|---|---|
| 2,628,369 | 2/1953 | Grimes et al. | 24/30.5 R |
| 3,621,539 | 11/1971 | Ayers | 24/30.5 R |
| 3,906,592 | 9/1975 | Sakasegawa et al. | 248/68.1 |
| 4,380,103 | 4/1983 | McGrath et al. | 24/543 |
| 5,123,146 | 6/1992 | Olson | 24/30.5 P X |

*Primary Examiner*—James R. Brittain
*Assistant Examiner*—Robert J. Sandy
*Attorney, Agent, or Firm*—Amster, Rothstein & Ebenstein

[57] ABSTRACT

A clip for use in connecting the wires of a mesh-defining lamp set intermediate the lamp sockets thereof, including a resiliently curved portion adapted to receive wires therethrough, a pair of intermediate portions extending outwardly of respective ends of the body portion and defining a neck extending outwardly of the body portion, and a pair of end portions extending from respective ones of the intermediate portions and configured and dimensioned to be locked together. A short one of the pair of end portions extends in a substantially transverse direction to the neck, is biased by the body portion in the substantially transverse direction, and terminates in a free end. A relatively longer one of the pair of end portions initially extends in the substantially transverse direction to the neck, parallel to the short end portion, and then defines a generally concave cap configured and dimensioned to receive and maintain therein against accidental dislodgement the short end portion free end.

8 Claims, 2 Drawing Sheets

CLIP FOR MESH-DEFINING LAMP SET

BACKGROUND OF THE INVENTION

The present invention relates to a clip for use in connecting the wires of a mesh-defining lamp set intermediate the lamp sockets thereof, and more particularly to such a clip which resists accidental opening thereof.

It is well known to provide a lamp set having a mesh (net-like) appearance by using clips to join or connect the wires of the lamps set intermediate the lamp sockets thereof. Such clips are typically more aesthetic than the use of a metal strip wound about the two wires to be connected. The clips are typically formed of plastic and define a resiliently curved body portion adapted to receive the wires therethrough and a pair of end portions extending from the body portion and configured and dimensioned to be releasably locked together against accidental dislodgement.

Such clips have not proven to be entirely satisfactory in use. Most importantly, the clips tend to open accidentally, either during use or storage of the lamp set, thereby allowing the joined wires to separate and thus destroying the desired regular pattern of the mesh formed by the lamp set. This is especially noticeable when the clips contain a resiliently curved body portion adapted to receive wires therethrough while allowing intentional separation of the end portions and passage there between of the wires into and from the body portion (either with or without the use of tools).

Accordingly, it is an object of the present invention to provide a clip for use in connecting the wires of a mesh-defining lamp set intermediate the lamp sockets thereof wherein the end portions of the clip may be locked against accidental dislodgement.

Another object is to provide such a clip in which the end portions may be intentionally dislodged from one another in order to free the wires connected thereby.

A further object is to provide such a clip which is simple and economical to manufacture, use and maintain.

SUMMARY OF THE INVENTION

It has now been found that the above and related objects of the present invention are obtained in a clip for use in connecting the wires of a mesh-defining lamp set intermediate the lamp sockets thereof, comprising a resiliently curved body portion adapted to receive wires therethrough, a pair of intermediate portions extending outwardly from respective ends of the body portion and cooperatively defining a neck extending outwardly of the body portion, and a pair of end portions extending from respective ones of the intermediate portions and configured and dimensioned to be locked together. A short one of the pair of end portions extends in a substantially transverse direction to the neck, is biased by the body portion in the substantially transverse direction, and terminates in a free end. A relatively longer one of the pair of end portions initially extends in the substantially transverse direction to the neck, parallel to the short end portion, and then defines a generally concave (preferably cup-shaped) cap configured and dimensioned to receive and maintain therein against accidental dislodgement the short end portion free end.

In a preferred embodiment, in the longer end portion, the intermediate portion and the end portion are connected by a resilient living hinge such that the cap is pivotal between a locking orientation wherein said cap receives and maintains therein the short end portion free end, and an unlocked orientation wherein the cap does not receive the short end portion free end.

Preferably, the body portion strongly biases the free end of the short end portion into the cap of the relatively longer end portion when the cap is in the closed orientation.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
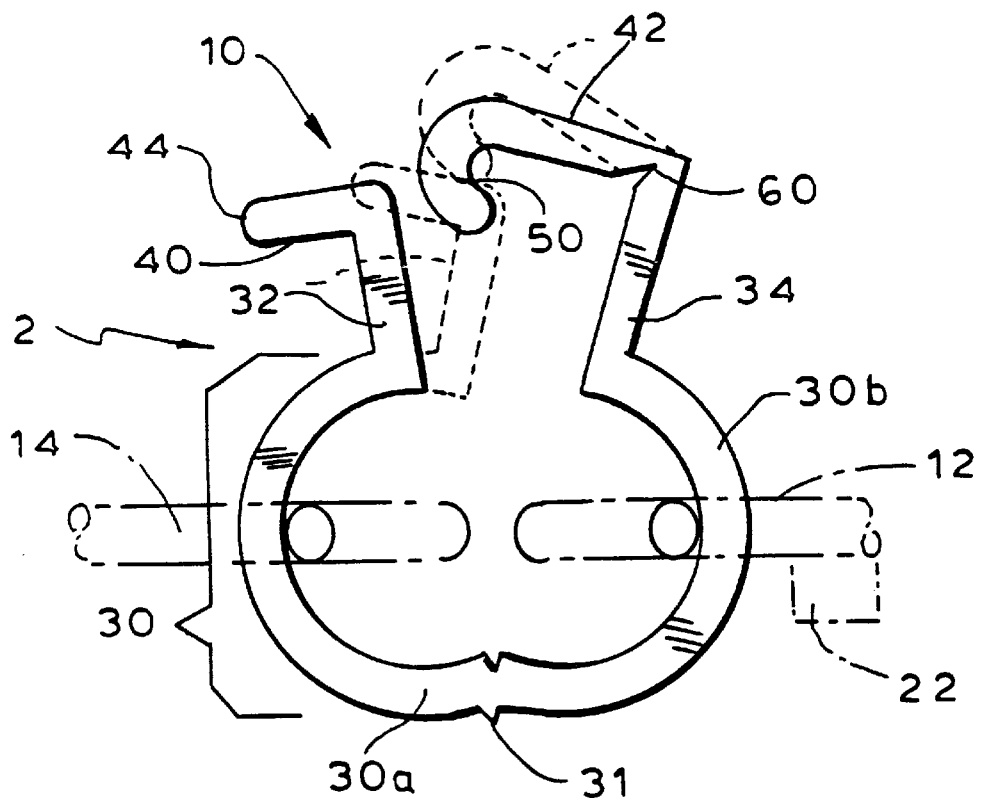
FIG. 1 is a front elevational view of a clip according to the present invention in an open orientation, with wires extending therethrough illustrated in phantom line.
Figure 2:
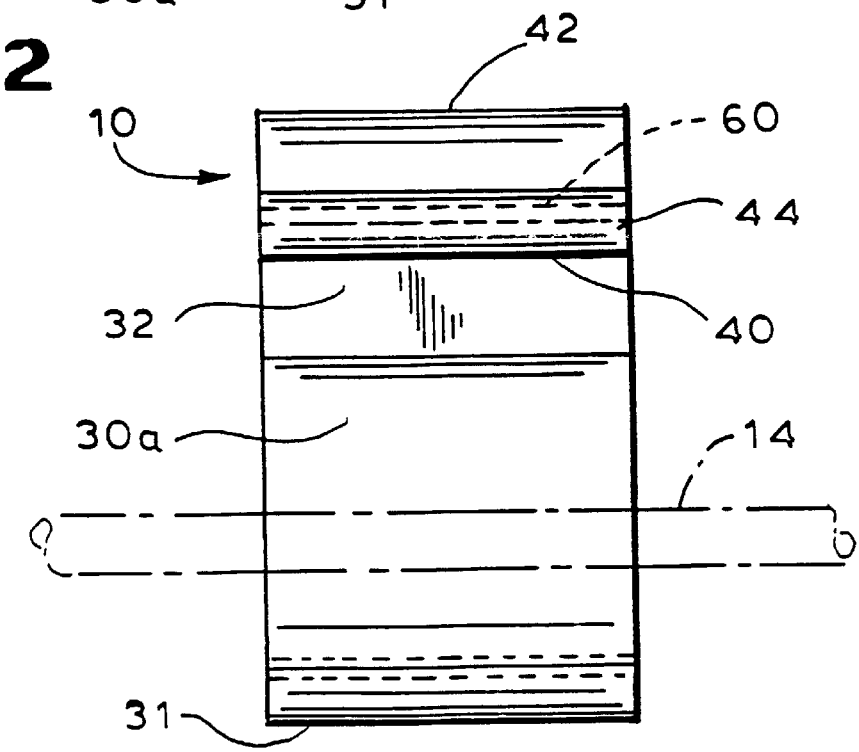
FIG. 2 is a side elevational view thereof.
Figure 4:
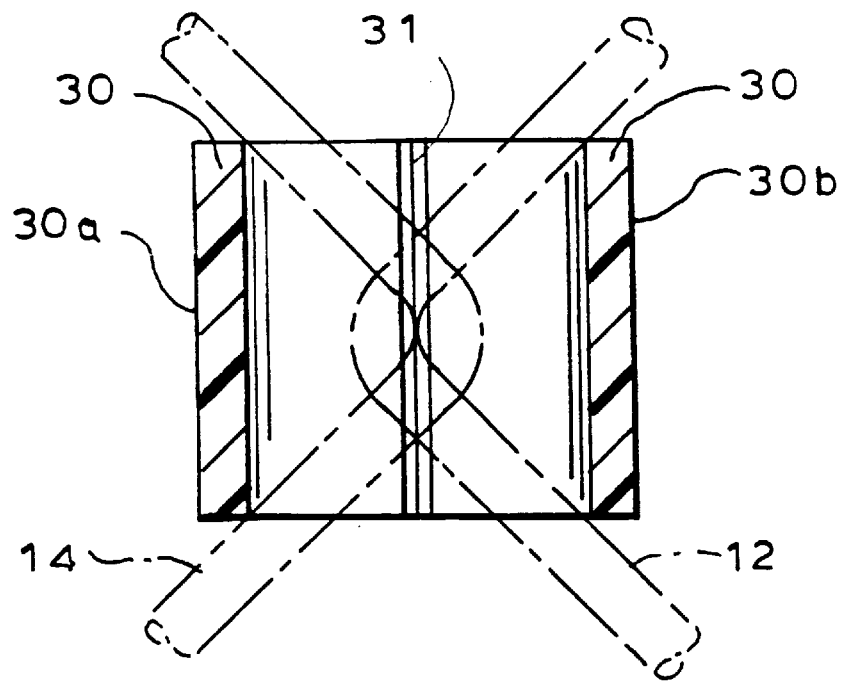
FIG. 4 is a elevational view taken along line 4—4 of FIG. 3.
Figure 3:
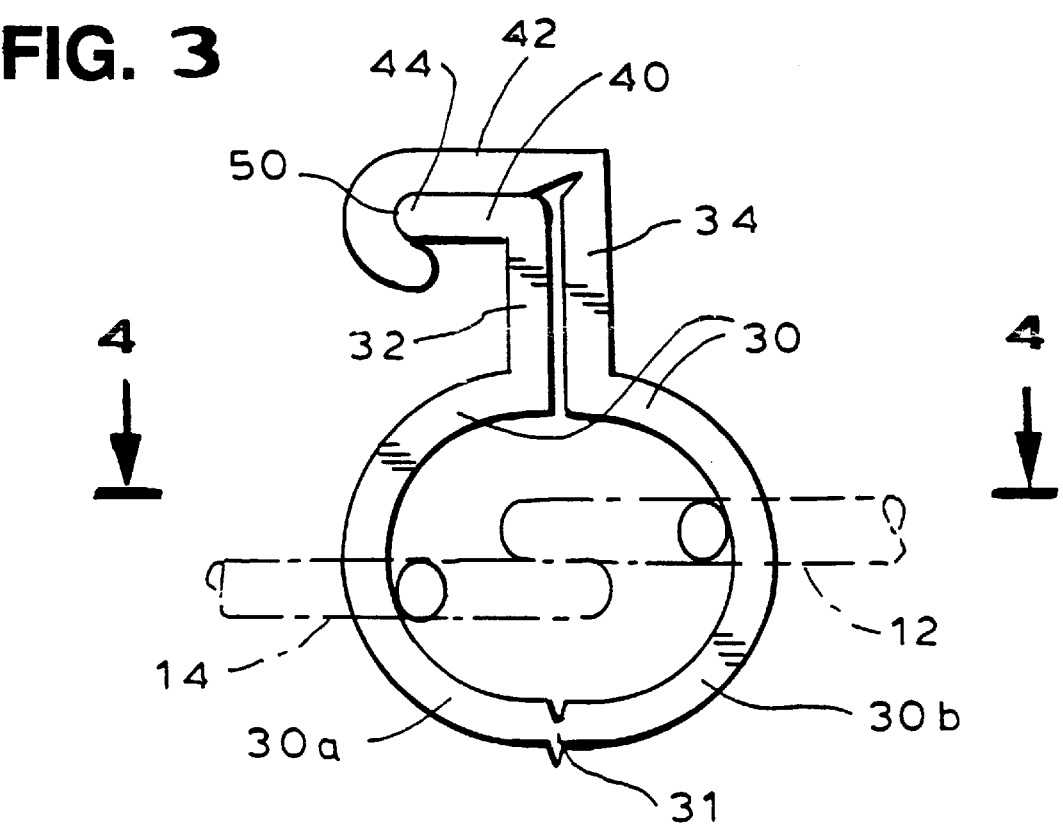
FIG. 3 is a front elevational view of the clip in a closed orientation, with wires extending therethrough illustrated in phantom line.

Referring now to the drawing, and in particular to FIGS. 1 and 3 thereof, therein illustrated is a clip according to the present invention, generally designated by the reference numeral 10. The clip 10 is movable between two orientations, the open orientation illustrated in FIG. 1 and the closed orientation illustrated in FIG. 3.

The clip 10 is used in connecting the intersecting or adjacent wires 12, 14 of a mesh defining (net-defining) lamp set 20 intermediate the lamp sockets 22 thereof. While only two wires 12, 14 are illustrated (in phantom line), clearly three wires or even a greater number of wires may be connected by the clip 10. In the context of the mesh defined by the lamp set, the wires 12, 14 to be connected may be intersecting, adjacent, or contiguous at the point where the clip is used. The clip 10 is preferably formed of a strongly resilient plastic such as polypropylene.

The clip 10 defines a resiliently curved body portion 30 adapted to receive the wires 12, 14 therethrough. In order to maintain the substantial semi-circularity of each of the two halves 30a, 30b of the body portion 30 during opening and closing of the clip 10, a parting or bending line 31 is preferably disposed between the two semi-circular halves 30a, 30b of body portion 30. While the body portion 30 is illustrated as having the configuration of an arc of a circle, clearly other configurations may be used without departing from the principles of the present invention. For example, the body portion could be a rectangle which exerts the necessary force to maintain the ends thereof in a locking orientation against accidental dislodgement.

The clip 10 additionally defines a pair of intermediate portions 32, 34 which define a neck, generally designated 36, extending outwardly of the body portion 30. Each intermediate portion 32, 34 extends from a respective end of the body portion, the two intermediate portions 32, 34 preferably extending parallel to one another and preferably linearly in the closed orientation of the clip 10 (see FIG. 3). As illustrated, the intermediate portions 32, 34 forming the neck 36 of dip 10 are connected to the respective ends of the body portion 30 rigidly (or almost rigidly) so that each end of the body portion 30 and its respective intermediate portion 32 or 34 move as a unit. Accordingly, opening of the body portion 30 is impossible without separation of the intermediate portions 32, 34 of the clip neck 36, but separation of the intermediate portions 32, 34 of the clip neck 36 results in opening of the body portion 30 sufficiently to enable the passage of wires 12, 14 into or out of the body portion 30.

The clip 10 further includes a pair of end portions 40, 42 extending from respective ones of the intermediate portions 32, 34. The end portions 40, 42 are configured and dimensioned to be releasably locked together against accidental dislodgement.

More particularly, the shorter end portion 40 extends in a substantially transverse direction to the neck 36 and terminates in a free end 44. The relatively longer end portion 42 initially extends in the same substantially transverse direction to the neck 36 so that it is preferably initially parallel to the shorter end portion 40.

The short end portion 40 terminates in a free end 44, which may be flat or convexly shaped according to the intended application. By way of contrast, the longer end portion 42 defines a generally concave cap 50 configured and dimensioned to receive and maintain therein against accidental dislodgment the short portion free end 44 (when the clip 10 is in the closed orientation of FIG. 3). In the closed orientation of the clip 10, the longer end portion cap 50 preferably extends in a substantially transverse direction to the short end portion 40, with the cap 50 aligned with the short portion free end 44. Clearly the length of longer end portion 42 will at least slightly exceed that of the short end portion 40 so that the cap 50, which depends (preferably transversely) from the longer end portion 42, can receive therein the free end 44 of the short end portion 40. The cap 50, which is preferably cup-shaped, presents towards free end 44 a surface which may be flat or concave according to the intended application.

The ends of the body portion 30 are biased towards an extended orientation such that the body portion 30 biases the free end 44 of the short end portion 40 into the cap 50 of the relatively longer end portion 42 when the cap 10 is in the locking orientation (and the clip 10 is in the closed orientation). Depending upon the resiliency of the body portion 30 (and this in turn will be influenced not only by the nature of the material used to form the clip 10, but also the dimensions thereof), the free end 44 is preferably strongly biased to enter and remain in the cap 50.

The longer end portion 42 and its respective intermediate portion 34 are preferably connected by a resilient living hinge 60 such that the cap 50 (and indeed the entire longer end portion 42 extending from the living hinge 60) is pivotal between a locking orientation wherein the cap 50 receives and maintains therein the short end portion free end 44, and an unlocked orientation wherein the cap 50 does not receive therein the short end portion free end 44. When the clip 10 is in the closed orientation of FIG. 3 (with the cap 50 in the locking orientation), the wires 12, 14 of the lamp set are connected or joined by the clip and precluded from passage through closed neck 36; when the clip 10 is in the open orientation of FIG. 1 (with the cap 50 in the unlocked orientation), the wires 12, 14, can pass into or out of the clip body portion 30 via opened neck 36.

The strength of the living hinge 60 strongly affects the ease of closing and opening of the dip 10—that is, the disengagement and engagement of the short end portion free end 44 and the longer end portion cap 50. The clip is best opened not by attempting to longitudinally force the short portion free end 44 away from the long end portion cap 50, but rather by pivoting outwardly the entire length of the longer end portion 42 beyond the living hinge 60 until the cap 50 disengages from the free end 44. Clearly this can be influenced to a large degree by the relative curvatures of the free end 44 and the surface of the cap 50 on which free end 44 rides during the transition from a closed clip orientation to an open dip orientation. A convexly curved free end 44 and a concavely curved cap 50 facilitate movement of a closed clip 10 into the open orientation.

The clip 10 of the present invention is particularly aesthetic in its appearance, as the major length of the long segment 34, 42 parallels the short segment 32, 40 up to the cap 50.

It has been found that the afore described configuration of the clip 10 provides a very high level of security against accidental dislodgement of the short end portion free end 44 from the long end portion cap 50 so that the clip 10 remains in the closed orientation until it is intentionally opened.

To summarize, the present invention provides a clip for use in connecting the wires of a mesh-defining lamp set intermediate the lamp sockets thereof, wherein the end portions of the clip may be locked against accidental dislodgement, but, in a preferred embodiment, are intentionally dislodge able. The clip is simple and economical to manufacture, use and maintain.

Now that the preferred embodiments of the present invention have been shown and described in detail, various modifications and improvements thereon will become readily apparent to those skilled in the art. Accordingly, the spirit and scope of the present invention is to be interpreted broadly and limited only by the appended claims, and not by the foregoing specification.

I claim:

1. A clip for use in connecting wires of a mesh-defining lamp set intermediate lamp sockets thereof, comprising:
   (A) a resiliently curved body portion adapted to receive wires therethrough;
   (B) a pair of intermediate portions spaced apart from each other for substantially their entire lengths, from respective ends of said body portion and cooperatively defining a neck extending outwardly from said body portion; and
   (C) a pair of end portions extending from respective ones of said intermediate portions and locked together;
      (i) a short one of said pair of end portions extending in a substantially transverse direction to said neck, being biased by said body portion in said substantially transverse direction to said neck, and terminating in a free end; and
      (ii) a relatively longer one of said pair of end portions initially extending in said substantially transverse direction to said neck, parallel to said short end portion, and then defining a generally concave cap configured and dimensioned to receive and maintain therein against accidental dislodgement said short end portion free end.

2. The clip of claim 1 wherein, said longer end portion and said respective one intermediate portion are connected by a resilient living hinge such that said cap is pivotal between a locking orientation wherein said cap receives and maintains therein said short end portion free end, and an unlocked orientation wherein said cap does not receive said short end portion free end.

3. The clip of claim 1 wherein said body portion strongly biases said free end of said short end portion into said cap of said relatively longer end portion.

4. The clip of claim 2 wherein said body portion strongly biases said free end of said short end portion into said cap of said relatively longer end portion when said cap is in said locking orientation.

5. The clip of claim 1 wherein said cap is cup-shaped.

6. A clip for use in connecting wires of a mesh-defining lamp set intermediate lamp sockets thereof, comprising:

(A) a resiliently curved body portion adapted to receive wires therethrough;

(B) a pair of intermediate portions spaced apart from each other for substantially their entire lengths, extending outwardly from respective ends of said body portion and cooperatively defining a neck extending outwardly from said body portion; and (C) a pair of end portions extending from respective ones of said intermediate portions releasably locked together;

(i) a short one of said pair of end portions extending in a substantially transverse direction to said neck, being biased by said body portion in said substantially transverse direction, and terminating in a free end; and (ii) a relatively longer one of said pair of end portions initially extending in said substantially transverse direction to said neck, parallel to said short end portion, and then defining a generally concave cap configured and dimensioned to receive and maintain therein against accidental dislodgement said short end portion free end, said longer end portion and said respective one intermediate portion being connected by a resilient living hinge such that said cap is pivotable between a locking orientation wherein said cap receives and maintains therein said short end portion free end, and an unlocked orientation wherein said cap does not receive said short end portion free end;

whereby said body portion biases said free end of said short end portion into said cap of said relatively longer end portion when said cap is in said locking orientation.

7. The clip of claim 6 wherein said cap is cup-shaped.

8. The clip of claim 2 wherein said pair of intermediate portions spaced apart from each other are parallel for substantially their entire lengths when said cap is in said locking orientation.

\* \* \* \* \*